INVENTOR.
OTTO SCHUELLER

Jan. 21, 1969   O. SCHUELLER   3,422,458
FLEXIBLE STRUCTURE FOR PRESSURIZED GARMENTS
Filed Aug. 6, 1963   Sheet 5 of 6
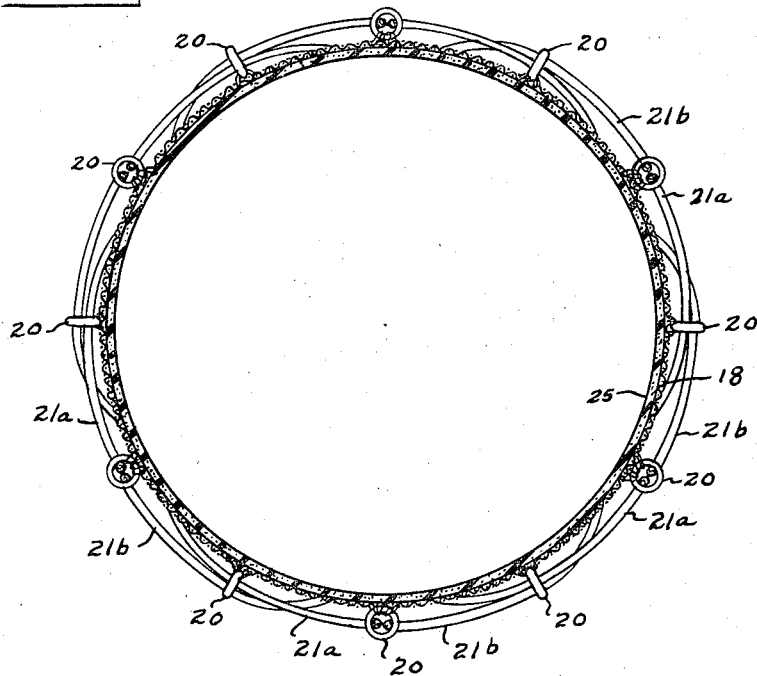
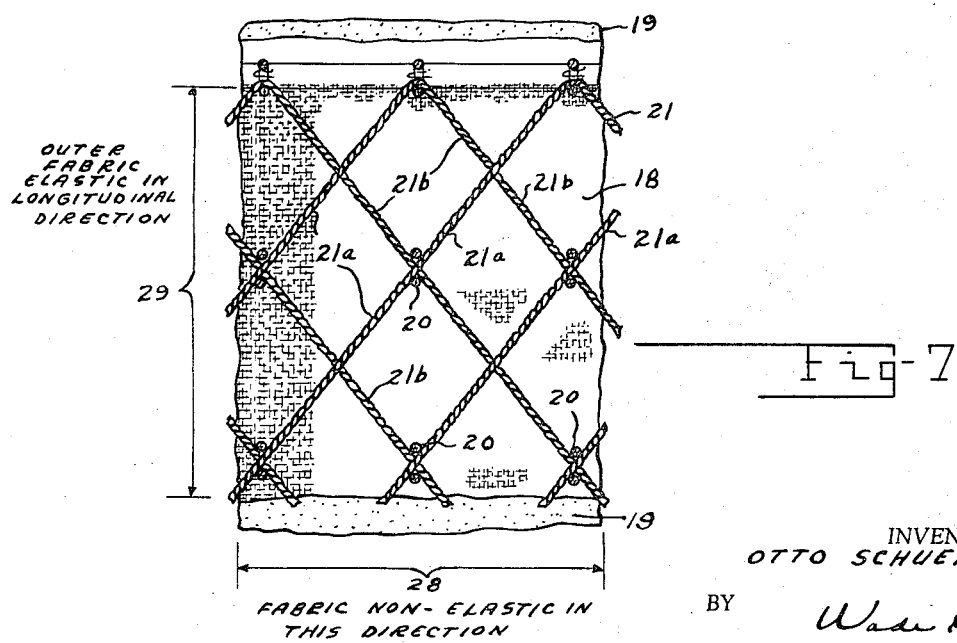
INVENTOR.
OTTO SCHUELLER

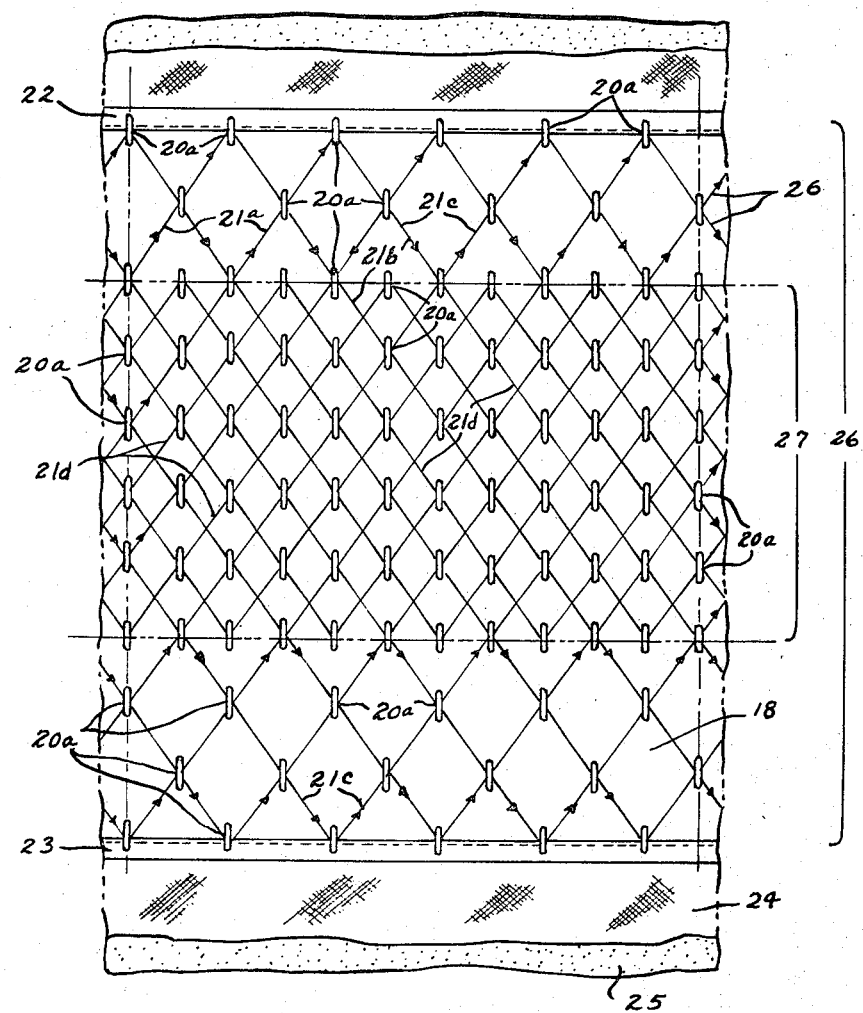

United States Patent Office 3,422,458
Patented Jan. 21, 1969

3,422,458
FLEXIBLE STRUCTURE FOR PRESSURIZED GARMENTS
Otto Schueller, Dayton, Ohio, assignor to the United States of America as represented by the Secretary of the Air Force
Filed Aug. 6, 1963, Ser. No. 300,383
U.S. Cl. 2—2.1                    16 Claims
Int. Cl. B63c *11/00;* A41d *13/00*

The invention described herein may be manufactured and used by or for the United States Government for governmental purposes without payment to me of any royalty thereon.

This invention relates to pressurized garments such as aviators' suits, space suits, divers' suits and flexible manipulators in space cabins which are inflated or pressurized internally to a relatively greater interior pressure than the exterior pressure, having for an object means to greatly improve the mobility of such pressurized garments to overcome the stiffness and resistance to bending thereof in any direction when inflated, and effect an elimination of the energy required to maintain the bent portion of the garment aforesaid in substantially any bended or adjusted positions.

Conventional means have been proposed in the prior art, in an effort to overcome the stiffness in protective assemblies, such as, full pressure suits having arm and leg receiving portions which are subject to internal pressure. These include "bellows" type joints with restraint cable extending along the neutral flexion lines of the body joints, or the use of restraint link devices, as shown and described in U.S. Patent No. 2,335,475. However, none of these prior devices have been completely satisfactory to achieve the natural flexibility of movement of the limbs, joints, and trunk portion of the human body, when the garment is inflated, or when the internal pressure particularly in the arm and leg enclosures exceeded the external pressure. The internal pressure in these garments exerts considerable longitudinal stress, particularly in the trunk, arm and leg portions making the bending of the joints and flexibility of movement somewhat difficult, requiring considerable force and energy to bend the joints from an equilibrium position, and the expenditure of considerable continuous energy to retain the joints when bent, in their bent conditions, due to their inherent tendency to straighten out and return to their equilibrium positions by reason of the internal pressure tending to straighten out these arm and leg portions.

Another conventional method is to restrain pressure-tight fabric garments by link-type nets. While this method approaches somewhat closer to the universal flexibility of the human body, it requires high bending forces when inflated, and a tiring effort to maintain any desired joint position beyond a certain equilibrium position, since the internal pressure is always effective to return the garment to this equilibrium position.

An object of this invention is the provision of an improved full pressure-type of suit or garment which, when inflated, requires only a relatively small force and expenditure of energy to bend or adjust the joints in any desired direction and no effort at all is needed to maintain the joints in equilibrium in any bent position.

A further object is the provision of a full pressure suit having substantially universal flexibility of the body and limb portions when inflated, or deflated.

A further object is the provision of means for eliminating the effort and energy required to maintain equilibrium of the trunk, leg and arm portions of an internally pressurized suit or garment in any desired adjusted position.

Another object is the provision of a full pressure suit or garment requiring small forces to bend the joints thereof in any desired direction and substantially no energy to maintain the joints in bent condition, which is easily adaptable to various body configurations and dimensions, and provides a suit or garment having low bulk and weight and is fairly comfortable to wear, even when inflated.

Another object is the provision of a pressure-tight flexible enclosure garment for receiving the limb portion a wearer, having an outer longitudinally extensible flexible limb enclosure portion adapted to extend longitudinally beyond the opposite ends of a joint of a wearer with an inner pressure-tight flexible extensible liner and includes a self-adjustable crisscross network of flexible nonstretchable cable means extending in zigzag fashion across each other around said enclosure portion between the opposite ends thereof including cable retaining ring members fixed relatively to the exterior of the enclosure at the points of crossing of said cable means with said cable means slidably extending through said ring members in slidable relation to each other where they cross each other.

Other objects and advantages of the invention will become apparent from the following description and accompanying drawings in which like reference characters refer to like parts in the several figures.

FIG. 5 is a transverse sectional view taken about on line 5—5 of FIG. 3 to show the inner air impervious inflatable suit portion and the outer fabric layer to which the slip rings for guiding the suspension cords are connected.

FIG. 6 is an expanded fragmentary view of the circumference of a slightly modified joint surrounding portion laid out flat, to show ring and endless self-adjusting surrounding cable patterns for instance for a tubular flexible manipulator extending outwardly into a lower pressure chamber.

FIG. 7 is an enlarged fragmentary plan view showing a ring and endless cord portion in connection with an outer fabric layer which is elastic or extensible longitudinally, and is nonextensible transversely to the axis of the limb enclosure portion showing the end rows of the rings at opopsite ends of the joint enclosure portion.

Figure 1:
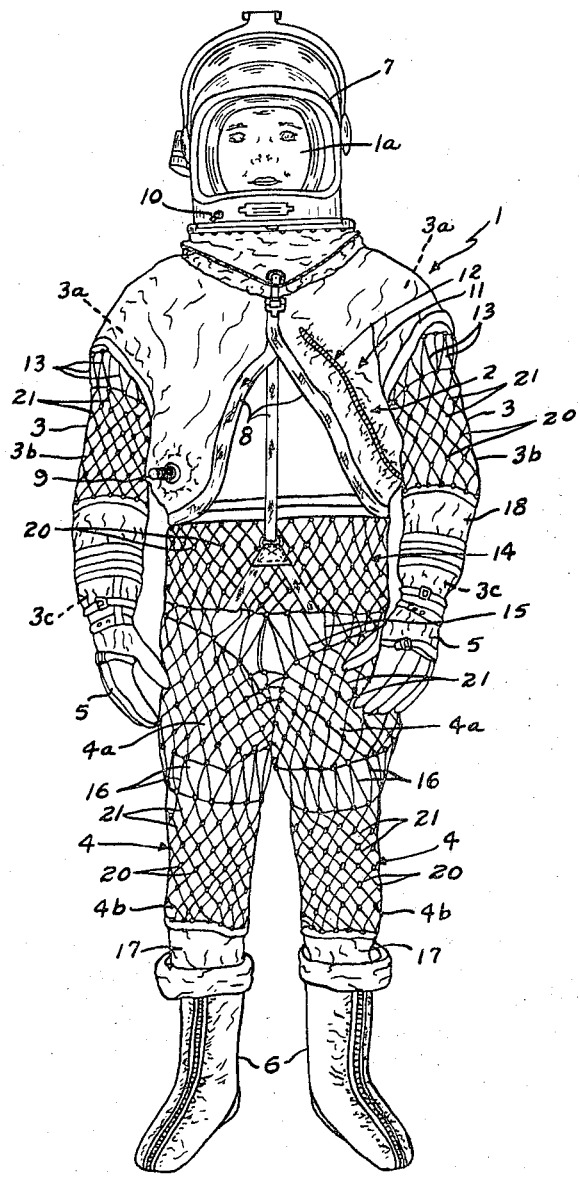
FIG. 1 is a front view of a full pressure suit incorporating the invention with an occupant therein, showing the suit in deflated condition.
Figure 2:
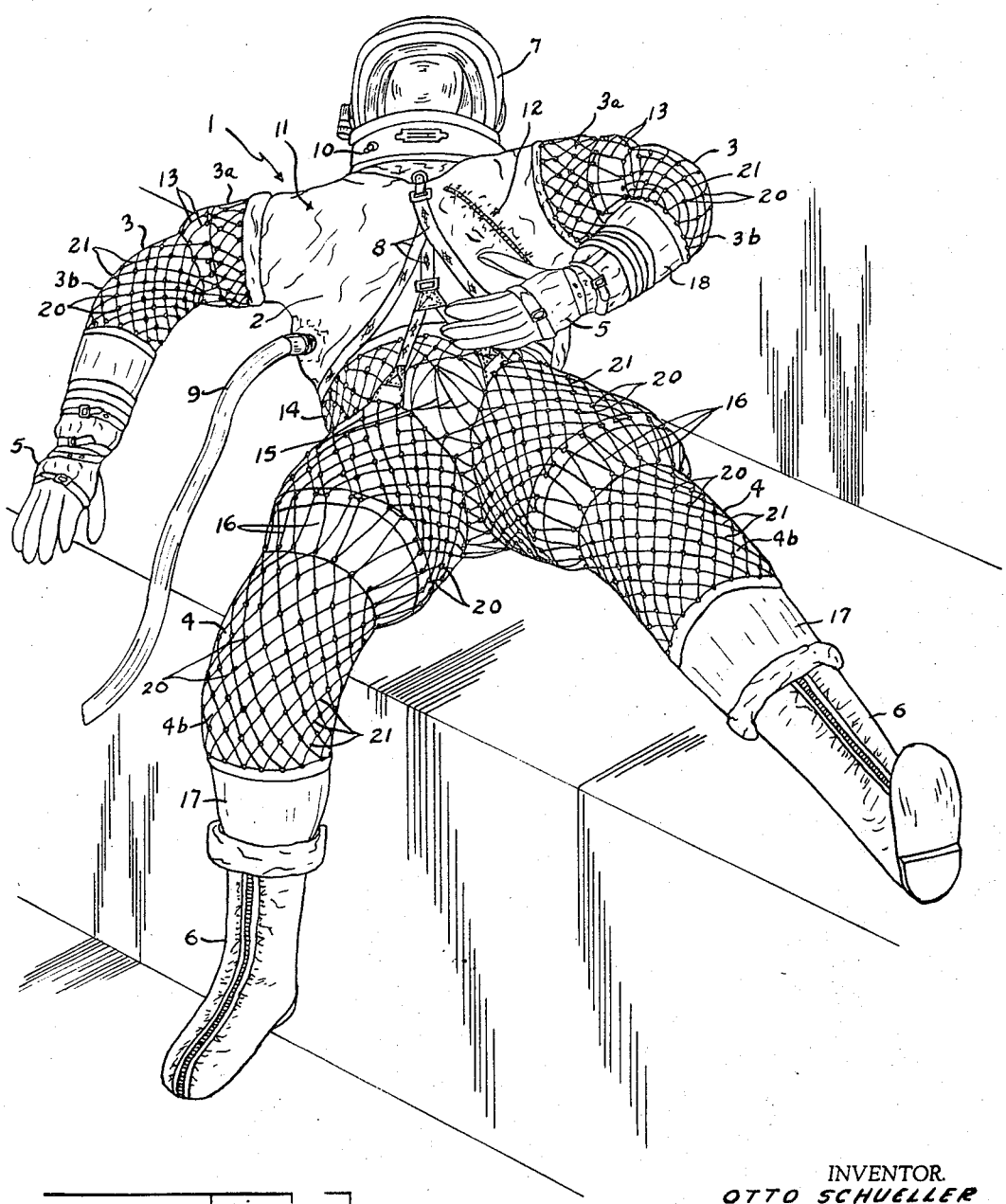
FIG. 2 is a view of the same suit when inflated, or pressurized, however, without an occupant, and in a reclining position to show the bend retaining qualities of the joint enclosure portions thereof.

Referring to the drawings, particularly FIGS. 1 and 2, the reference numeral 1 denotes a full pressure suit or garment generally incorporating the invention, comprising a torso or trunk portion 2 having upper limb or arm portions 3 and lower limb or leg portions 4, the arm portions 3 being closed by suitable glove or mitt enclosures 5 which are secured to and close the outer extremities of the arm enclosures 3 forming the sleeve portions of the suit.

The extremities of the leg or lower limb portions 4 are likewise closed by the boot-like members 6 for receiving the feet of the wearer.

The reference numeral 7 denotes a space helmet of somewhat conventional construction including hold-down strap means 8.

Pressure is supplied to the interior of the body or trunk portion (and limb portions) when desired by an air or gaseous pressure supply tube or umbilical conduit 9.

However, it may be desirable to supply an inert gas to maintain internal pressure in the body of the suit when required, rather than oxygen, in which event oxygen is supplied to the interior of the helmet 7 when needed by a separate conduit connected in communication with the interior of the helmet 7 through a suitable fitting therein, such as indicated at 10.

In FIGS. 1 and 2, the reference numeral 11 denotes a loose jacket structure which fits over the flexible self-adjusting confining net structure, the jacket having zipper means 12 for removal. However, this jacket structure 11 has been omitted from the other drawings as it is not necessary to the understanding of the invention.

Usually the known prior art full pressure suits when inflated are stiff, heavy, and considerable energy is required to bend the portions thereof surrounding the joints of the arms, legs and trunk portions of the wearer as these portions of the suit have a natural tendency when inflated to straighten out and return under the internal pressure to a predetermined equilibrium position. In other words, when the joint enclosure portion is bent, the internal pressure in the suit (and absence of pressure exterior of the suit) tends to cause these joint enclosure portions to straighten out or return again to their equilibrium position. Therefore, when a flexible joint or waist portion of the conventional full pressure suit of the prior art is bent by the articulated movements of the limbs or waist portion of the wearer, a considerable amount of energy is continuously required to maintain the bent portions of the suit against straightening out and returning to their initial equilibrium positions.

Applicant's invention avoids the above difficulties and disadvantages of prior art full-pressure suits in that it provides substantially free articulated movements of the limbs and waist or trunk portions of the wearer in substantially any direction without excessive effort, and when bent there is no energy required to maintain the limb and waist portions in their bent or rotated positions due to the self-adjusting sustaining cable enclosure network surrounding the suit, particularly around the articulated joints and trunk portion of the wearer.

In FIG. 1, taken from an actual photograph, the pressure suit is shown in its normal noninflated condition with an occupant therein indicated at 1a, while in FIG. 2 is illustrated the same suit, also taken from a photograph, showing the suit fully inflated but without an occupant or wearer therein and resting inclined on a couch-like support, clearly illustrating the universal articulation or bending and torsional qualities at the waist, and in the limb portions, and their lack of tendency to be straightened out by internal pressure from their bent conditions and, return to any predetermined position.

As seen in FIGS. 1 and 2, the portions surrounding the articulated joints and trunk portion of the wearer are each substantially uniform in cross-section from end to end. For instance, the portions enclosing the upper arms and shoulder portions are uniform in cross-section from end to end, indicated at 3a, while the portions enclosing the elbow joints, indicated at 3b are smaller but also uniform in cross-section from end to end and are connected by cable members 13 which extend longitudinally or substantially longitudinal, with the limb enclosures thus permitting torsional movements between the portions 3a and 3b when the suit is inflated (or deflated).

Likewise, the portions between the waist or trunk 14 and the upper leg enclosures 4a of the adjustable cable confining network are also connected by substantially longitudinally extending cable conecting portions 15 to permit torsional or rotative movements between the legs and hips of the wearer when the suit is inflated.

The upper leg or thigh enclosure portions 4a are also preferably uniform in cross-section from end to end and are each connected at their lower ends by a portion of the cable network 16 which extends substantially longitudinal, to the lower leg enclosure portions 4b which are also uniform in cross-section from end to end, thus providing further torsional freedom between the trunk and feet of the wearer, when inflated. The lower ends of the lower limb enclosures 4b being connected to the receiving enclosure portions 17, which may be encased in the boots 6, or other type shoes.

It will be seen that the self-adjustable criss-cross or rhombic pattern cable network surrounding the joints prevents elongation of the limbs and waist or body portions of the suit while permitting free bending thereof in substantially any direction while the intermediate connecting portions 13, 15 and 16 allow limited torsional movement between the torso and limb portions of the suit (and the wearer) especially when the suit is inflated. The normal inflation pressure within the suit, upon decompression exterior of the suit, is about 3.5 to 5 lbs. per square inch and, of course, the pressurization can be accomplished directly by making the suit within the cable restraining criss-cross network impervious and supplying air through the conduit 9, or the internal pressure may be supplied by suitable expansible bladder or capsulated means which automatically expands to provide the necessary internal pressure on the occupant incident to a decompression exterior of the suit, in which event the suit would not necessarily have to be impervious or airtight but could be reasonably porous for ventilation. However, the confining self-adjustable network of the subject invention would prevent expansion and elongation while maintaining the desired pressure on the body of the wearer and freedom of relative bending and torsional movement in the trunk or body and limb portions of the suit.

Figure 3:
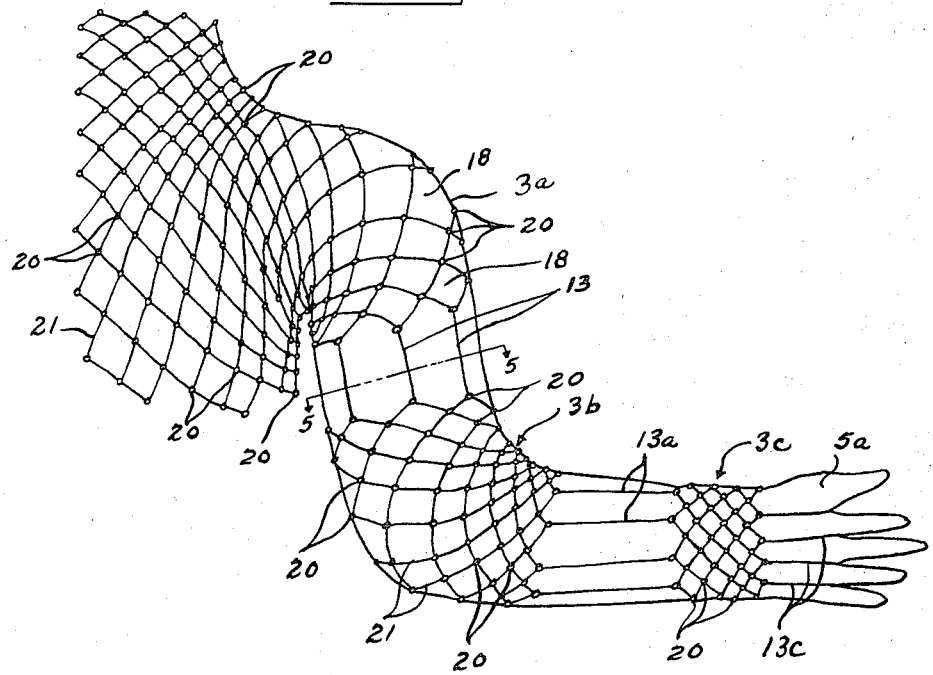
FIG. 3 is a fragmentary somewhat schematic detail elevation of the arm, shoulder and neck portions showing the general arrangement of the self-adjusting suspension cord rhomboidal or diamond shape confining cable network and the slide ring cable guide means arrangement for maintaining the cords or cables in slidable relation to each other at their cross-over points.
Figure 8:
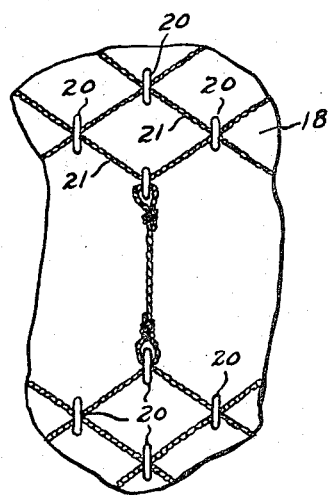
FIG. 8 is a fragmentary elevation view showing the longitudinally extending cable means separate from the criss-cross cables to provide for torsional movement between the trunk anl limbs which is connected to the adjacent circular rows of rings at opposite ends of the joint, through which the oppositely inclined criss-cross cables slidably pass.
Figure 4:
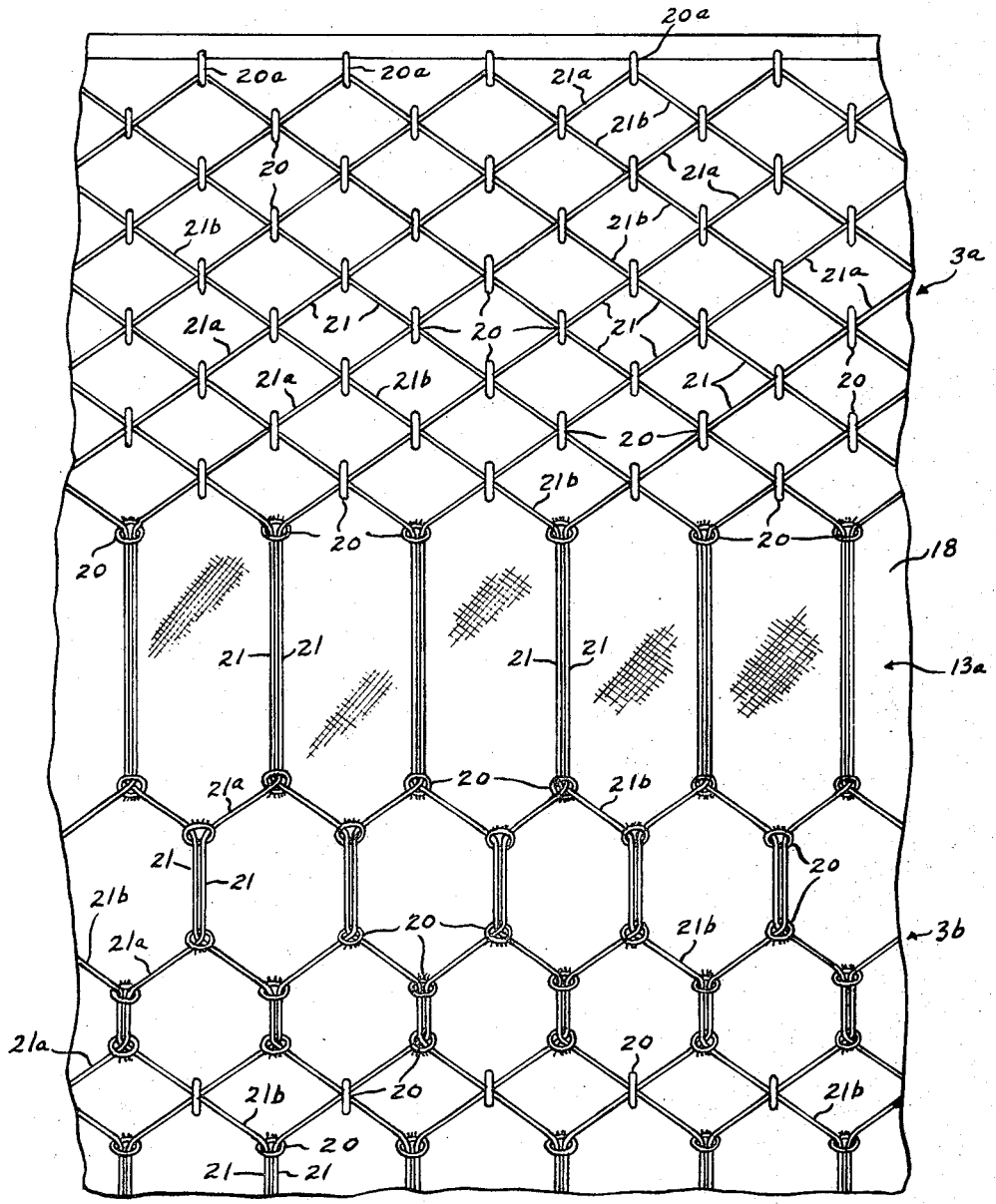
FIG. 4 is a somewhat schematic enlarged fragmentary detail view, showing one form of self-adjusting supporting cord lacing or network for providing a flexible self-adjusting fabric supporting or confining structure for a trunk, leg or arm portion of a full pressure suit employing crisscross endless cable lacing.

Referring now to the somewhat schematic fragmentary detail view in FIG. 3 illustrating a portion of the torso or trunk, neck, shoulder and upper limb or arm portion of the suit, and the view shown in FIG. 4, the pressure suit enclosure is indicated at 18 which may be made of any suitable flexible material, either permeable to air or pressure tight, or it may include a thin impervious lining 19 of rubber or other expandable or stretchable material. The outer suit layer 18 has secured thereon a plurality of cable-retaining guide means or rings 20, which are arranged in a rhombic-type layout or pattern more clearly disclosed in FIG. 4, through which a criss-cross network of self-adjustable nonstretchable confining cords or cables 21 slidably extend, being slidably received through the rings 20 in slidable relation to each other.

As set forth in connection with FIGS. 1 and 2, the shoulder and neck portion 3a of the cable network is connected by the longitudinal connecting cords or cable portions 13 (or 21 in FIG. 4) and, if desired, the elbow joint enclosing cable portions 3b may be separated from the wrist portion network 3c by the longitudinally extending connecting cable portions 13a to provide free articulation and torsional movements at the wrists of the wearer. The cords 13c are connected to the network 3c and extend between the fingers of the hand enclosures 5a closing the outer ends of the upper limb enclosure.

As seen in the several figures, the confining flexible self-adjustable cord or cable network pattern is held in its rhombic pattern by the ring members 20 with the cables 21, extending or inclined back and forth in opposite inclined directions, the cables criss-crossing each other in slidable relation to each other and to the rings 20, as is more clearly seen in FIGS. 4 and 5.

In schematic view FIG. 4, the sustaining or confining cables 21 criss-cross zigzag back and forth as shown, with the rings 20 between the articulated joint portions, for instance, 3a and 3b spaced materially farther apart longitudinally to provide the portion 13a between the sections 3a and 3b with the cords or cables 21 guided longitudinally. The cables 21 are slidably adjustable through the rings 20. For instance, the cables, as seen in FIG. 4, incline upwardly to the right and through the uppermost rings 20a and then incline downwardly in the same direction (to the right) to the bottom where they pass through the lower rings and then extend upwardly and again to the right and through the upper rings 20a again and downwardly to the right, forming a criss-cross network having a rhomboidal pattern for resisting outward expansion and elongation of the pressure suit portions with the cables 21 slidable in the rings 20 and 20a, and on each other, when the waist and limb portions of the suit are bent or are rotated, incident to bending and torsional movements of the limbs or the trunk or body portions of the wearer.

FIGS. 5 and 7 show a portion of the self-adjustable retaining and confining cable network which surrounds one of the limb portions and it should be observed that the cables comprise one portion which extends helically about the suit portion in one direction indicated at 21a while the other cable portion 21b extends helically in the opposite direction between the upper and lower ends of the joint enclosures, the cables crossing each other through the rings 20.

In FIG. 6 is shown a circular limb enclosure which is split longitudinally and laid open flat, for instance, a whole arm enclosure which may be used as an external manipulator from within a pressurized cabin.

The upper end is indicated at 22 and the lower or outer end at 23, and would enclose the arm and wrist joint of a wearer or manipulator. In this form, a transverse section through the manipulating enclosure would be similar to that section shown in FIG. 5.

The outer and ring supporting fabric is indicated at 24 in FIG. 6, while the inner air impervious lining is indicated at 25, closed at its outer end by a manipulator means such as a glove or mitt (not shown).

Referring again to FIG. 7, it may be desirable to make the outer fabric 18 with a one-way stretch construction, for instance, in the limb enclosing portion, to provide a fabric which has substantially no stretch in the transverse or limb and trunk encircling direction 28 but is elastic in the longitudinal direction 29.

In the drawings, the guide ring members 20 (and 20a) are shown as being sewn directly to the exterior of the outer fabric structure 18 of the suit. However, while this may be a simple way to retain the rings 20 in position in the longitudinally and circumferentially spaced rows in order to maintain the confining criss-cross nonstretchable retaining self-adjustable cable means in their substantially rhombic pattern or design, it is contemplated that the rings may be secured to the exterior of the suit, or in position relative thereto, by other means such as by elastic connections, or the rings may be connected to each other by flexible connections to hold the rings in their desired positions, or they may be secured to a flexible net enclosure surrounding the exterior of the trunk and limb enclosure portions of the suit so that the rings will remain in their relatively spaced relation to each other during the bending and torsional movement of the trunk and limb enclosure portions of the suit while the suit is inflated.

In this form, as seen in FIG. 6 there are illustrated two sets of confining self-adjusting cable network structures 21c and 21d, the network cables 21c extending between the end bands 22 and 23 and is indicated by the zone 26 while the intermediate cables 21d form an intermediate cable network group 27.

In this form, both groups or zones of cables 26 and 27 are slidable in the rings 20a which are arranged in rows which are spaced circumferentially around the enclosure, thus forming transverse rows extending around the suit enclosure, to form a rhombic pattern cable network with the endless cables 21c and 21d zigzagging back and forth around the enclosure through the guide ring means 20a.

In the constructions described, it is desirable that the length of the enclosing portions (legs, arms and trunk) be longer than the legs, arms and trunk portions of the wearer to prevent restraint while the self-adjusting cable confining network maintains a uniform confining pressure on the exterior of the fabric of the suit and while retained in a substantially rhombic pattern, the cables adjust or slide on each other through the guide ring means when the trunk and limb portions of the suit are being bent or twisted, and therefore have a tendency to remain in their adjusted positions until adjusted to some different position or angle by the wearer.

Since the internal pressure within the suit is equal in all directions, and the enclosing self-adjustable pressure resisting cable network surrounding the exterior of the suit resists this outward pressure equally in all directions, there is little or no tendency of the limb or trunk portions to return to any predetermined equilibrium position following the bending or twisting thereof. Any small unbalance or tendency of the limb portions to return to any particular or "backspring" position will be resisted by the slight friction of the cables on each other and on the confined fabric. Therefore, there is no energy required as in other full pressure suits, once the trunk and limb portions are bent, to maintain the same in any bent or rotated positions.

For purposes of exemplification of the invention, a particular embodiment of the invention has been shown and described to the best understanding thereof. However, it will be apparent that certain minor changes and modifications in the arrangement and construction of the parts thereof may be resorted to without departing from the true spirit and scope of the invention as defined or set forth in the accompanying claims.

I claim:

1. A flexible high altitude pressure garment for maintaining the wearer thereof under greater fluid or mechanical pressure than the surrounding fluid pressure exterior of the garment, including a limb and trunk receiving enclosure having an extensible flexible portion therein to permit substantially universal bending, swinging and torsional movements of the articulated limb and trunk portions of a wearer enclosed therein comprising, cylindrical universally flexible enclosures adapted to extend longitudinally beyond the opposite sides of the joints of the wearer's limbs and trunk, a multitude of substantially uniformly spaced cable guide members fixed relatively to the outer surface of said flexible enclosure in positions around and along the same in spaced transverse vertical and horizontal rows, and a plurality of substantially nonextensible flexible endless cords slidably extending in opposite directions around said flexible enclosure in zigzag fashion between the upper and lower rows in angularly intersecting slidable relation to each other through said guide members between the upper and lower ends of said limb or trunk enclosures to encompass the exterior of said flexible limb and trunk enclosure from end to end and resist elongation thereof due to greater internal relative pressure within said enclosure while slippage of the cables through the rings permit bending of the limb and trunk receiving enclosures.

2. A high altitude pressure suit for maintaining the wearer thereof under greater fluid or mechanical pressure inside of the suit than the surrounding fluid pressure exterior of the suit, said suit having a torso-receiving portion and limb-receiving enclosures extending therefrom having flexible portions therein to provide for substantially unrestricted articulated bending and torsional movements of the limbs and torso of the wearer, said flexible portions comprising elongated substantially cylindrical enclosures adapted to extend around and longitudinally beyond the opposite sides of the articulated joints of the wearer's torso and limbs, a plurality of self-adjusting endless nonextensible confining cord members extending in zigzag fashion around the exterior of said flexible portions in opposite intersecting directions between the opposite ends of each of said elongated substantially cylindrical enclosures to form a substantially open self-adjusting nonelastic cable confining cross-cross network of cables between the upper and lower ends of the cylindrical enclosures, and a plurality of cable retainer guide members secured to the exterior of said cylindrical enclosures at the upper and lower ends of the enclosures and points of crossing of said cables, said cable members slidably extending through said cable retainer guide members at the points of crossing of said criss-cross network of cable members in said self-adjusting network of said oppositely extending zigzag endless cable members.

3. A high altitude pressure protective flexible enclosure adapted to receive a limb of a wearer therein including a universally flexible longitudinally extensible substantially cylindrical elongated portion adapted to extend longitudinally beyond the opposite ends of an articulated joint of the limb of a wearer when inserted therein, a plurality of substantially uniformly spaced horizontal rows of substantially uniformly spaced slip cord guide members secured on and around the outer surface of said cylindrical enclosure between the opposite ends thereof in a substantially rectangular network pattern, flexible nonextensible self-adjustable endless cord members slidably extending through said slip cord guide members in a zigzag fashion in opposite directions around the enclosure between the opposite ends of the cylindrical enclosure in intersecting directions to each other, whereby to provide an endless unknotted confining net-like cord enclosure completely surrounding said cylindrical elongated joint enclosure portion aforesaid from end to end thereof, said cord members passing slidably through said slip guide members in slidable relation to each other to form a self-adjustable endless nonextensible network of a substantially diamond to rhomboidal cord arrangement, resisting excessive longitudinal internal pressure stresses on said cylindrical enclosure which would normally have a tendency to lengthen and resist bending and torsional stresses and tend to straighten out said enclosures, due to internal pressure when the same is bent or twisted by articulated movements of the limb therein of a wearer.

4. An inflatable flexible elongated circular air pressure impervious enclosure adapted to receive a limb of a wearer therein comprising, a pressure-tight flexible substantially cylindrical nonexpandable elongated extensible portion adapted to extend longitudinally beyond the opposite ends of an articulated joint of the limb of a wearer around the outer surface of the limb when inserted therein, a multitude of cable guide rings fixed around the outer surface of said enclosure in substantially uniform circumferentially spaced rows in substantially uniform longitudinally spaced relation to each other in each row around the exterior of said cylindrical elongated portion from end to end thereof, in a substantially rectangular pattern, endless nonextensible flexible cables slidable through said cable guide rings in inclined opposite directions around said enclosure in zigzag crossing fashion between the opposite ends of the elongated portion in slidable relation to each other to form a substantially diamond-shaped unknotted self-adjustable confining network of endless cable members extending completely around said elongated cylindrical portion in opposite circumferential directions to resist relative higher pressure within said elongated portion and prevent elongation of said portions during bending thereof, tending to straighten out said elongated portion when bent.

5. A human limb-receiving elongated extensible nonexpandable impervious flexible sleeve-like member adapted to receive an internal gaseous fluid inflation pressure exceeding the pressure exteriorly on the sleeve-like member, tending to lengthen and straighten out the sleeve-like member when bent, a sliding self-adjusting criss-cross cable suspension system enclosing said sleeve-like member comprising nonextensible endless cord members extending in opposite circumferentially inclined directions around said sleeve-like member in a substantially diamond-shaped crossing network pattern slidably connected to said sleeve-like member in spaced intersecting longitudinal and lateral locations circumferentially around and between the opposite longitudinal end portions thereof, including slip rings fixed relative to the exterior of said sleeve-like member having said cord member extending freely slidably therethrough at the points of crossing of said cords, forming said self-adjusting substantially diamond-shaped surrounding nonextensible cable network for resisting elongation of said sleeve-like member, when bent, to prevent the straightening out tendency thereof incident to internal pressure therein normally due to inflation and elongation of said sleeve-like member.

6. A limb-receiving sleeve member subject to a relatively greater internal pressure than the pressure exteriorly thereof comprising, an elongated substantially cylindrical tubular flexible extensible nonexpandable pressure inflatable member adapted to receive the limb of a wearer therein, a multitude of cable retainer rings positioned longitudinally and laterally around the exterior of said extensible member in substantially equally spaced transverse rows, to form a substantially rectangular pattern of cable retainer rings surrounding said extensible member from end to end thereof, a slidable self-adjustable cord suspension system comprising nonextensible cables laced through said cable retainer rings in sliding diagonally inclined self-adjusting relation in a criss-cross pattern through said rings between the opposite ends of said elongated substantially cylindrical tubular flexible extensible member extending in opposite circumferentially inclined directions completely around said member.

7. A high altitude full and mechanical pressure suit comprising, an inflatable flexible extensible nonexpansible body enclosure adapted to receive the torso and limbs of a wearer, a multitude of cable guide members fixed relative to the exterior of said expansible body enclosure in a substantially diamond-shaped pattern comprising spaced rows of said cable guide means circumferentially encircling said body enclosure, in uniformly spaced transverse rows substantially normal to said encircling rows, endless nonextensible cable means extending slidably through said cable guide means in oppositely inclined relation to said rows in opposite circumferential directions around said body enclosure, to provide a relatively self-adjusting cable network surrounding said body enclosure from end to end in criss-cross fashion for retaining said expansible body enclosure against extension when inflated, to permit substantially easy bending movement of said body enclosure and eliminate straightening movements thereof incident to internal pressure therein.

8. A pressure suit comprising a flexible expansible body having a longitudinally extensible universally flexible limb-receiving enclosure, a multitude of cable guide ring members fixed relative to the exterior surface of said enclosure in a plurality of substantially equally spaced longitudinal and transverse rows encircling said enclosure in a substantially rectangular pattern, nonextensible flexible endless cable members extending around said enclosure in right and left helical intersecting directions to cross said rectangular pattern diagonally in opposite directions through said guide ring members in slidable relation to each other and said ring members, whereby internal pressure in said longitudinally extensible limb-receiving member is balanced to equally resist longitudinal extension and lateral expansion to provide for easy bending of said limb-receiving enclosure in any direction and eliminate the force or tension usually necessary to retain said limb-receiving enclosure when bent against the internal inflation pressure tending to straighten out said enclosure.

9. An inflatable high altitude full pressure suit having elongated enclosures adapted to receive the limbs of a wearer, each elongated flexible extensible cylindrical enclosure adapted to extend longitudinally beyond the opposite ends of an articulated joint of the limb of a wearer when inserted therein, each elongated cylindrical enclosure having substantially equally circumferentially spaced longitudinal rows of cable guide rings, spaced substantially equal in each row fixed exteriorly to the outer surface of said elongated cylindrical enclosure, an endless nonstretchable diamond pattern self-adjustable cable network extending slidably guided through said guide rings extending circumferentially in oppositely inclined slidable crisscross relation to each other alternately between the opposite ends of said elongated flexible cylindrical enclosure to resist longitudinal extension thereof, and straightening due to internal pressure therein when bent tending to longitudinally extend said cylindrical enclosure.

10. A pressure suit comprising a flexible and extensible elongated body portion having extensible arm and leg receiving universally flexible portions, an outer self-adjustable criss-cross net-like structure comprising nonstretchable endless cable members extending around the outer surface of said body, arm and leg receiving portions in opposite circumferentially inclined relation in an unconnected substantially diamond-shaped pattern in slidable relation to each other and the outer surface of said body, arm and leg portions for resisting outward expansion and elongation thereof due to relative greater internal pressure within the suit while permitting substantially unrestricted universal movement between said body and said arm leg portions due to the self adjusting nonconnected oppositely extending inclined cable members.

11. A high altitude pressure suit as set forth in claim 10 in which a multitude of cable retainer guide rings are fixed relative to the outer surface of said body, arm and leg portions, slidably receiving said cable members therethrough at the points of crossing of said criss-cross pattern oppositely extending cable members for retaining said cable members in predetermined self-adjusting net-like pattern during articulated movements of and between said arm, leg and body portions.

12. A pressure suit as set forth in claim 11, in which said body and said arm and leg portions comprises a flexible porous longitudinally extensible outer layer having said cable retainer guide rings fixed thereto and an inner stretchable flexible impervious layer for retaining a fluid pressure within the suit in excess to the pressure exterior to the suit.

13. A full pressure suit as set forth in claim 12 in which said inner and outer layers are substantially separate and said outer layer is extensible in a longitudinal direction only relative to the body, arm and leg portions, whereby said self-adjustable criss-cross nonextensible cable members resist longitudinal extension of said arm and leg portions due to internal pressure within the suit to prevent the straightening out said arm and leg portions after the same are bent in substantially any direction.

14. A substantially cylindrical, flexible sleeve-like inflatable enclosure adapted to receive and enclose a limb of a wearer therein and extend longitudinally beyond the opposite ends of at least two spaced adjacent bendable and torsionally movable joints in the wearer's limb to provide bending and torsional movements of said enclosure when inflated, with a wearer's limb therein between the opposite ends thereof comprising, a first flexible cylindrical sleeve portion adapted to surround and extend beyond the opposite ends of one of said wearer's joints, and a second flexible cylindrical adjacent spaced sleeve portion adapted to surround and extend beyond the opposite ends of the other joint in the wearer's limb, a multitude of cable guide rings fixed in circumferentially spaced parallel rows around each of said spaced joint enclosure portions in uniformly spaced aligned equally spaced relation in each row between the opposite ends of each of said enclosure portions, self-adjusting confining non-stretchable cable confining means inclining around both of said first and second enclosure portions in opposite directions back and forth between the opposite ends of said enclosure portions to form a continuous criss-cross self-adjusting confining cable network, extending completely around each of said enclosure portions between the opposite ends thereof, said cables slidably disposed in said guide rings at the opposite ends of the enclosures, extending back and forth diagonally in intersecting directions through said rings in slidable relation through the intermediate rings in said rows at said points of intersection, said cables extending longitudinally in substantially parallel relation to each other through and between the said rings at the adjacent ends of the first and second enclosure portions to provide torsional movement of said enclosure between the spaced first and second joint enclosure portions thereof, and resist longitudinal extension of said enclosure between said first and second enclosure portions.

15. In a flexible structure for pressurized garments a flexible cylindrical sleeve-like inflatable enclosure adapted to receive a limb of a wearer therein extending longitudinally beyond the opposite ends of at least two spaced adjacent bendable and relatively torsionally movable joints in the limb of the wearer to provide bending and torsional movements of said enclosure when inflated, with a wearer's limb enclosed therein comprising, a first flexible substantially cylindrical sleeve-like enclosure portion adapted to extend beyond the opposite ends of one of the bendable joints in the wearer's limb, a second flexible substantially cylindrical adjacent spaced sleeve-like enclosure portion adapted to surround and extend beyond the opposite ends of the other adjacent joint in the limb of the wearer, a multitude of spaced cable guide members disposed in substantially fixed relations to the exterior of said cylindrical enclosure portions in circumferentially spaced aligned rows around said enclosure portions between the opposite ends of each of said enclosure portions, forming a rectangular pattern of cable guide members completely around said enclosure portions between the opposite ends thereof, endless non-stretchable confining cable means extending around said enclosure portions in oppositely inclined non-connected crisscross slidable relation through said cable guide members between the opposite ends of said enclosure portions to confine the expansion and elongation of said portions during bending and torsional movements of the wearer's limb, said cables extending longitudinally in substantially parallel relation through said guide members at the adjacent ends of said enclosure portions between said portions to provide limited torsional movement in said sleeve-like enclosure between the opposite ends thereof incident to torsional movement of a wearer's limb therein, while resisting elongation of said sleeve-like enclosure.

16. In an inflatable pressurized garment adapted to receive a limb of a wearer, subject to bending and torsional movements, a substantially cylindrical flexible inflatable extensible nonexpandable sleeve like member for receiving a limb of a wearer to surround at least two adjacent spaced joints in the wearer's limb which are bendable and torsionally movable relative to each other, two groups of spaced cable guide rings disposed in relatively fixed relation to the exterior of said sleeve like member, one group disposed to surround and extend beyond the opposite ends of one of the wearer's joints, and the other group disposed in spaced relation to the first group to extend around and beyond the opposite ends of the other joint of the wearer's limb, said groups of cable guide rings disposed in substantially fixed relation to the outer surface of the sleeve like member in circumferentially spaced rows in transversely evenly spaced relation to each other, to provide a rectangular cable guide ring pattern surrounding said enclosure between the opposite ends of each joint enclosure portion, oppositely inclined self-adjusting non-stretchable confining cables slidably extending through said cable guide rings in zigzag fashion around said enclosure, back and forth between the cable guide rings at the opposite ends of each group of cable guide rings, said cables crossing each other in free-sliding diagonal intersecting relation to each other through said guide rings between the cable guide rings at the opposite ends of each group, to provide free sliding adjustment of the cables in said rings, relative to each other around the enclosure portions during bending of the enclosure portions, said cables including cable portions extending substantially longitudinally between the rings at the ends of the two groups which are located in adjacent spaced relation to each other, to provide for torsional movement in said enclosure between the said groups of cable guide rings.

References Cited

UNITED STATES PATENTS

| | | | |
|---|---|---|---|
| 2,954,562 | 10/1960 | Krupp | 2—2.1 |
| 3,081,459 | 3/1963 | Clark | 2—2.1 |
| 1,401,677 | 12/1921 | Dade | 9—20 |
| 1,430,194 | 9/1922 | Schweinert | 2—2.1 |
| 2,834,965 | 5/1958 | Flagg et al. | 2—2.1 |

FOREIGN PATENTS 577,101   5/1946   Great Britain.

ROBERT F. STAHL, *Primary Examiner.*